(12) United States Patent
Maple et al.

(10) Patent No.: US 7,412,612 B2
(45) Date of Patent: Aug. 12, 2008

(54) DYNAMICALLY OPTIMIZED POWER CONVERTER

(75) Inventors: Robert D. Maple, Noblesville, IN (US); Aurelien T. Mozipo, Kokomo, IN (US); Brian J. Denta, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 413 days.

(21) Appl. No.: 10/785,574

(22) Filed: Feb. 24, 2004

(65) Prior Publication Data

US 2005/0219883 A1    Oct. 6, 2005

(51) Int. Cl.
*G06F 1/26* (2006.01)
(52) U.S. Cl. .................... 713/320; 713/100; 713/340; 363/65; 363/178
(58) Field of Classification Search ................. 713/320, 713/340, 100; 363/178, 65
See application file for complete search history.

(56) References Cited

U.S. PATENT DOCUMENTS

| | | | | |
|---|---|---|---|---|
| 5,481,178 A | * | 1/1996 | Wilcox et al. ............... 323/287 |
| 5,493,154 A | * | 2/1996 | Smith et al. .................... 307/43 |
| 5,905,645 A | * | 5/1999 | Cross ........................... 363/65 |
| 6,002,597 A | * | 12/1999 | Rozman ................... 363/21.06 |
| 6,031,749 A | * | 2/2000 | Covington et al. ............. 363/98 |
| 6,154,381 A | * | 11/2000 | Kajouke et al. ............... 363/65 |
| 6,166,934 A | * | 12/2000 | Kajouke et al. ............... 363/65 |
| 6,188,586 B1 | * | 2/2001 | Farrington et al. ............ 363/17 |
| 6,304,473 B1 | * | 10/2001 | Telefus et al. ................. 363/97 |
| 6,351,396 B1 | * | 2/2002 | Jacobs ...................... 363/21.06 |
| 6,396,725 B1 | * | 5/2002 | Jacobs et al. ................ 363/131 |
| 6,424,129 B1 | * | 7/2002 | Lethellier .................... 323/272 |
| 6,664,657 B2 | * | 12/2003 | Hailey .......................... 307/52 |
| 6,940,261 B1 | * | 9/2005 | Umminger ................... 323/282 |
| 7,107,468 B2 | * | 9/2006 | Pullen et al. ................. 713/300 |
| 2002/0057080 A1 | * | 5/2002 | Telefus et al. ............... 323/283 |
| 2003/0179550 A1 | * | 9/2003 | Nebrigic et al. ............. 361/729 |
| 2003/0202367 A1 | * | 10/2003 | Schreiber ...................... 363/72 |
| 2003/0214274 A1 | * | 11/2003 | Lethellier .................... 323/272 |

\* cited by examiner

*Primary Examiner*—Thomas Lee
*Assistant Examiner*—Vincent T Tran
(74) *Attorney, Agent, or Firm*—Jimmy L. Funke (57) ABSTRACT

A device and method for dynamically optimizing a power converter is disclosed. The dynamically optimized power converter unit includes a processor that maximizes efficiency of a power converter supplying energy to a load.

3 Claims, 9 Drawing Sheets

DYNAMICALLY OPTIMIZED POWER CONVERTER

TECHNICAL FIELD

The present invention generally relates to power converters and, more particularly, to a dynamically optimized power converter.

BACKGROUND OF THE INVENTION

It is known in the art that the use of limited energy power sources has increased rapidly. Limited energy power sources are any energy source that has a limited energy capacity either by design or by its nature such as batteries, solar cells, fuel cells and even generators. These types of energy sources are at the heart of a number of electronic devices, such as, for example, cell phones, hand held games, and laptop computers. It is also known in the art that electric- and hybrid-electric-vehicles that use limited energy power sources, such as fuel cells, have a high cost to energy ratio. Similarly, lead acid batteries have a high weight to energy ratio. Such limited energy power sources point to the desirability to minimize the losses when providing energy to a load while increasing the energy supply between recharging or refueling periods in order to allow a user to operate the device or vehicle for longer durations.

A conventional power converter, which is the link between the energy source and load, tends to be a significant percentage of total system power loss, limiting the system efficiency, (i.e. the average output power divided by the average input power). Although the loss in efficiency may be as low as 5%, any loss limits or compromises the overall performance of the system. The loss in efficiency may be related to various parameters that include, but are not limited to, power consumption, switching frequency, temperature, component variations.

The temperature, for example, may be controlled to improve the efficiency by providing a heat sink for the power converter; however, the heat sink requires space thus, undesirably increasing the size of the electronic device. In many cases the heat sink is larger than the rest of the converter. In another example, size of the converter is also related to the switching frequency. For example, efficiency may be maximized when the switching frequency is reduced, which is achieved at the expense of more expensive and bulkier magnetic components and capacitors. Thus, there is a tradeoff and relation between size and the efficiency of the power converter.

Efficiency may change over the operating power consumption range (i.e. low power consumption, medium power consumption, and high power consumption). At low power consumption, the bias supply loss usually dominates the efficiency. For example, in a high frequency switching power supply, bias power is fixed and output power is reduced as the system operates at a lower power; therefore, the fixed bias power becomes a higher percentage of the overall total power loss, and, in some instances, when the system is operated at a relatively low power, the bias power may equal or exceed the output power. At the medium power consumption, switching losses dominate the efficiency formula, which are typically the source of most losses when both maximum output voltage across the switches and maximum current through them occur. At high power consumption, resistive losses dominate the efficiency formula.

In addition, the characteristics of the power components may vary when selected from a similar field of components. Even further, the power component tolerances (e.g. capacitive and inductive values) naturally change over time. Yet even further, physical changes to power components may occur over time as a result of being exposed to varying environmental conditions, such as temperature (e.g. varying environmental temperatures may have a detrimental effect on the insulative materials used in a component. Thus, physical changes and tolerance changes to power components may also result in a non-optimal application that was originally designed to operate at an optimal standard.

In most situations, power converters are normally optimized at a specific worst-case condition, such as, for example, maximum power consumption or highest operating temperature. In some situations, worst case condition efficiency optimization is set at a presumed operating condition that includes a combination of multiple parameters for example; operating at a high peak power for a short time, which relates to the peak operating temperature, for a system operating at 30% of the maximum power load. However, worse case condition settings may not always provide maximum efficiency if the system is not operated at the specific presumed settings. In a more application-specific example, a power converter efficiency optimization for a vehicular power brake system may include a worse case optimization for non-highway applications; conversely, the vehicle may be operated more often on a highway, thereby having shorter current duration periods and associated current surges that significantly decreases the optimization of the system. As a result, cost and size of the power brake system is increased as efficiency is decreased.

As understood from the explanation above, once the worst-case condition is defined, the process of optimization typically becomes a tradeoff between different design criteria (i.e. physical size of the electronic device and switching frequency). The end result is a static optimization at a presumed/predefined operating point, which typically occurs at maximum operational power and maximum temperature rating. This points to the deficiency of optimizing at one operating point in that the power converter may not operate at a presumably optimized point very often.

Conventional analog and digital controls cannot be designed to adapt to changing conditions without the additional cost of extra complicated circuitry. Even further, specific circuitry implemented for conventional analog and digital controls undesirably restricts functional monitoring of specific parameters for specific changing conditions. Even further, conventional analog and digital controls cannot adapt to constantly changing component tolerances. Thus, although adequate for monitoring specific parameters, conventional analog and digital controls undesirably restricts monitoring parameters and increases cost while also not considering dynamic changes in component tolerances.

Accordingly, it is therefore desirable to provide an ideal apparatus and method for efficiency optimization at every operating condition and component tolerance that can optimize power converter efficiency over the power converter's operating power range in an adaptive, dynamic manner.

SUMMARY OF THE INVENTION

The present invention relates to a device including a power source, a load, and a power converter unit including a processor. The processor dynamically optimizes the power converter to maximize the efficiency of the transfer of energy from the power source to the load.

BRIEF DESCRIPTION OF THE DRAWINGS

The present invention will now be described, by way of example, with reference to the accompanying drawings, in which.

DESCRIPTION OF THE PREFERRED EMBODIMENT

The above described disadvantages are overcome and a number of advantages are realized by the inventive dynamically optimized power converter unit, which is generally illustrated at 10 and 200 in FIGS. 1A, 1B and 3A, 3B, respectively. The efficiency of the unit 10, 200 can be optimized along the entire power efficiency curve (FIG. 5) by dynamically adapting itself to changing parameters and component tolerances that affect power converter efficiency. By utilizing the capabilities of a processor, which is seen generally at 50, 250 (FIGS. 1B, 3B), the unit 10, 200 is able to be dynamically optimized in view of the ever changing conditions and component tolerances. Essentially, the microprocessor 50, 250 provides an intelligent software-based monitoring system that may be altered at any time by a programmer to monitor, store, calculate, and compare varying dynamic parameters that were originally contemplated and/or unanticipated in the original monitoring program. Referring to both FIGS. 1A, 1B and 3A, 3B, the unit 10, 200 includes two parallel systems seen at reference numerals 25a, 25b and 225a, 225b, respectively; however, it is contemplated that the unit 10, 200 may be optimized to accommodate any desirable number of parallel systems, such as three, four, eight, or ten systems, which may be deactivated at any time to reduce gate power proportioned to the number of systems that are deactivated.

Figure 1A:
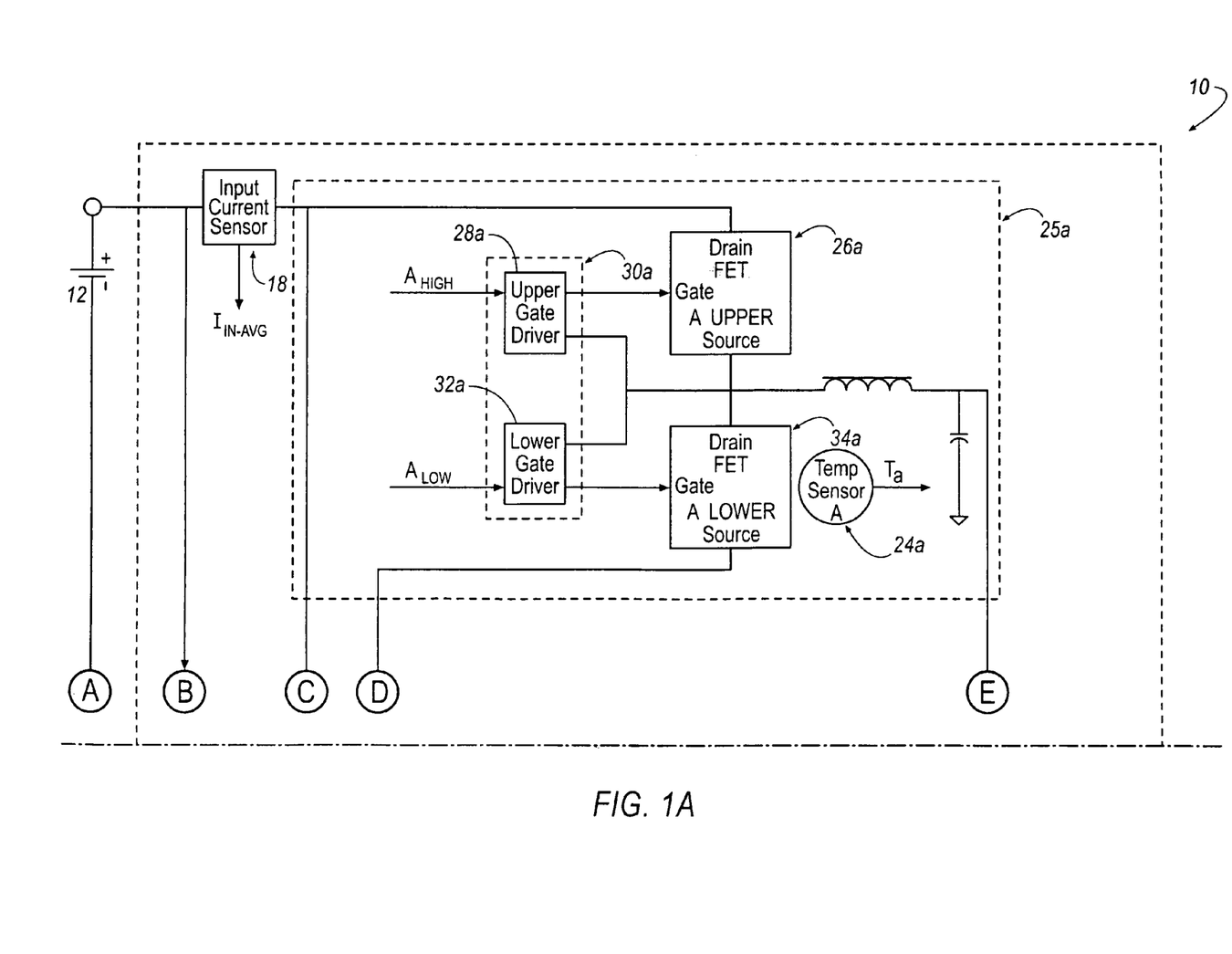
FIGS. 1A and 1B illustrate a dynamically optimized power converter unit according to one embodiment of the invention.
Figure 1B:
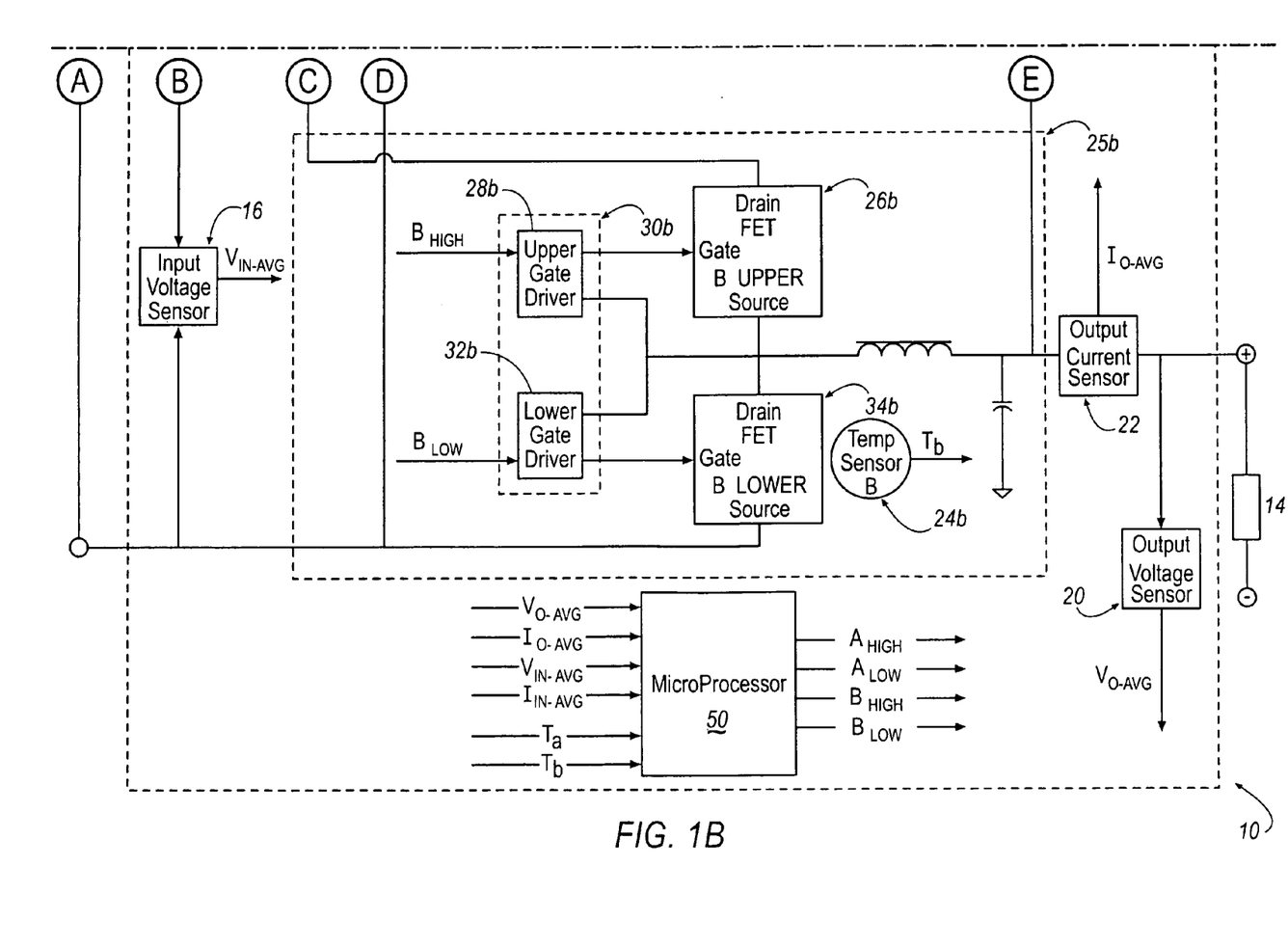

Referring initially to FIGS. 1A, 1B, the unit 10, as illustrated, may be implemented as a two phase-interleaved DC/DC hard-switch converter. For example, according to one embodiment of the invention, the unit 10 may be a 1500-watt converter. As seen in FIGS. 1A and 1B, the illustrated hard-switch converter unit 10 is commonly referred to in the art as a buck converter. Although not illustrated, any desirable type of hard-switch converter may be implemented in the design of the power converter unit 10, such as, for example, but not limited to buck converters, boost converters, buck-boost converters, fly-back converters, forward converters, push-pull converters, half bridge converters, full bridge converters, or the like.

As illustrated, the two-phase interleaved DC/DC hard-switched power converter 10 is connected to a power source 12 and a variable power load 14. Individual power converter modules are seen generally at reference numerals 25a, 25b, respectively. The processor 50 receives the average input voltage, $V_{IN-AVG}$, from input voltage sensor 16 and average input current, $I_{IN-AVG}$, from input current sensor 18 and uses those values to calculate input power. The processor 50 also receives average output voltage, $V_{O-AVG}$, from output voltage sensor 20 and average output current, $I_{O-AVG}$, from output current sensor 22 and uses those values to calculate output power. The processor 50 also receives temperature measurements, $T_a$, $T_b$, from temperature sensors 24a, 24b relating to each module 25a, 25b.

The duty cycle of each module 25a, 25b is related to the on-time of transistors 26a, 26b. Upon computing the required duty cycle for transistors 26a, 26b, the on-time is generated internally by the processor 50 and applied through the gating signals $A_{HIGH}$ and $B_{HIGH}$ that are input to upper-gate drivers 28a, 28b of gate driver units 30a, 30b, which are applied to gates of the transistors 26a, 26b, respectively. For a buck-converter-type implementation, the duty cycle in steady state is equal to the proportional relationship between the average output voltage, $V_{O-AVG}$, and the average input voltage, $V_{IN-AVG}$. If synchronous rectification is desired, gating signals $A_{LOW}$ and $B_{LOW}$ are input to lower-gate drivers 32a, 32b of the gate driver units 30a, 30b, which are applied to gates of transistors 34a, 34b, respectively. Typically, synchronous rectification is used in a low voltage/high frequency application when field effect transistors (FETs) are used as a switching device.

Figure 2A:
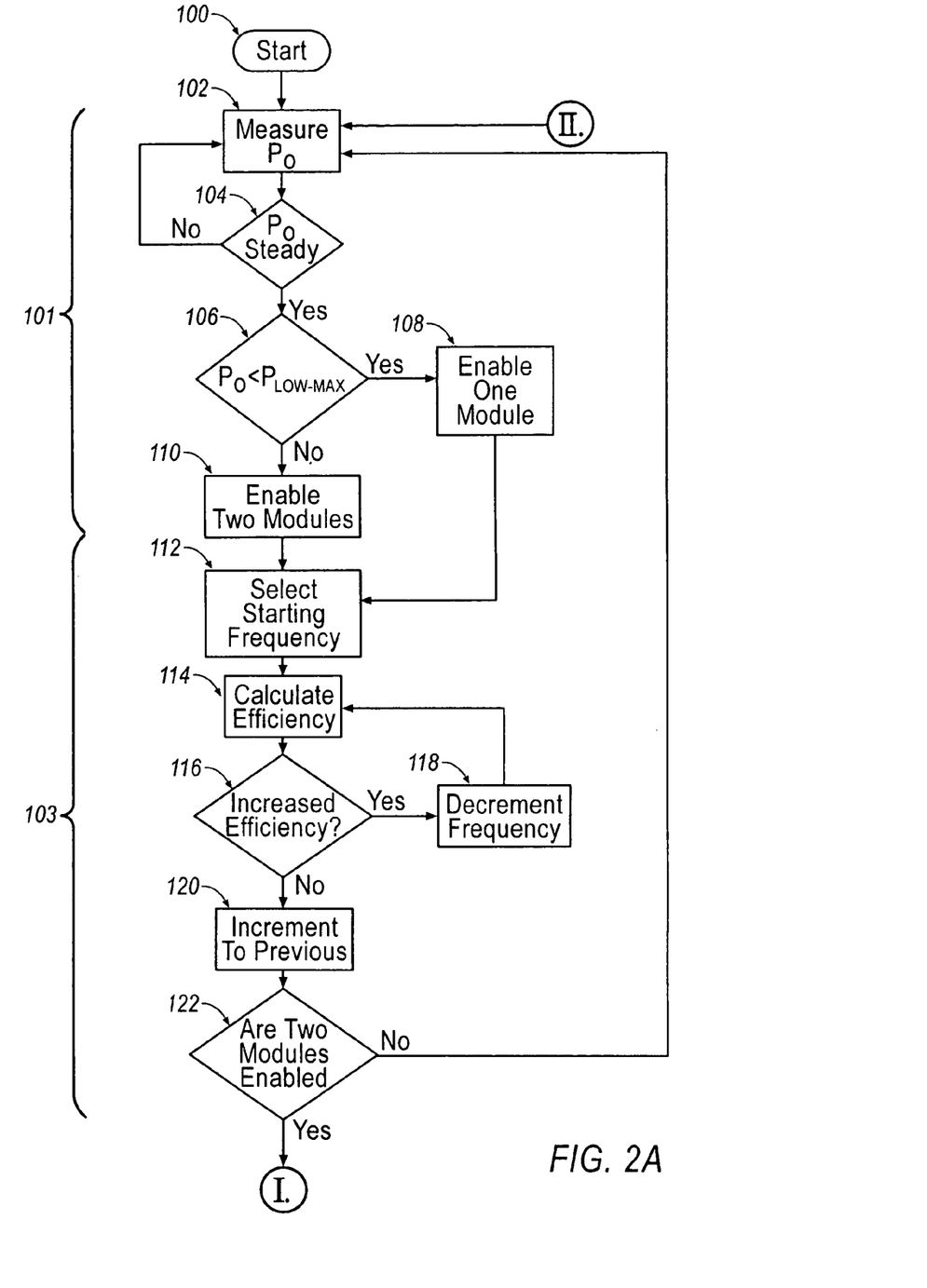
FIGS. 2A and 2B illustrate a flow chart algorithm for the dynamically optimized power converter unit according to FIGS. 1A and 1B.
Figure 2B:
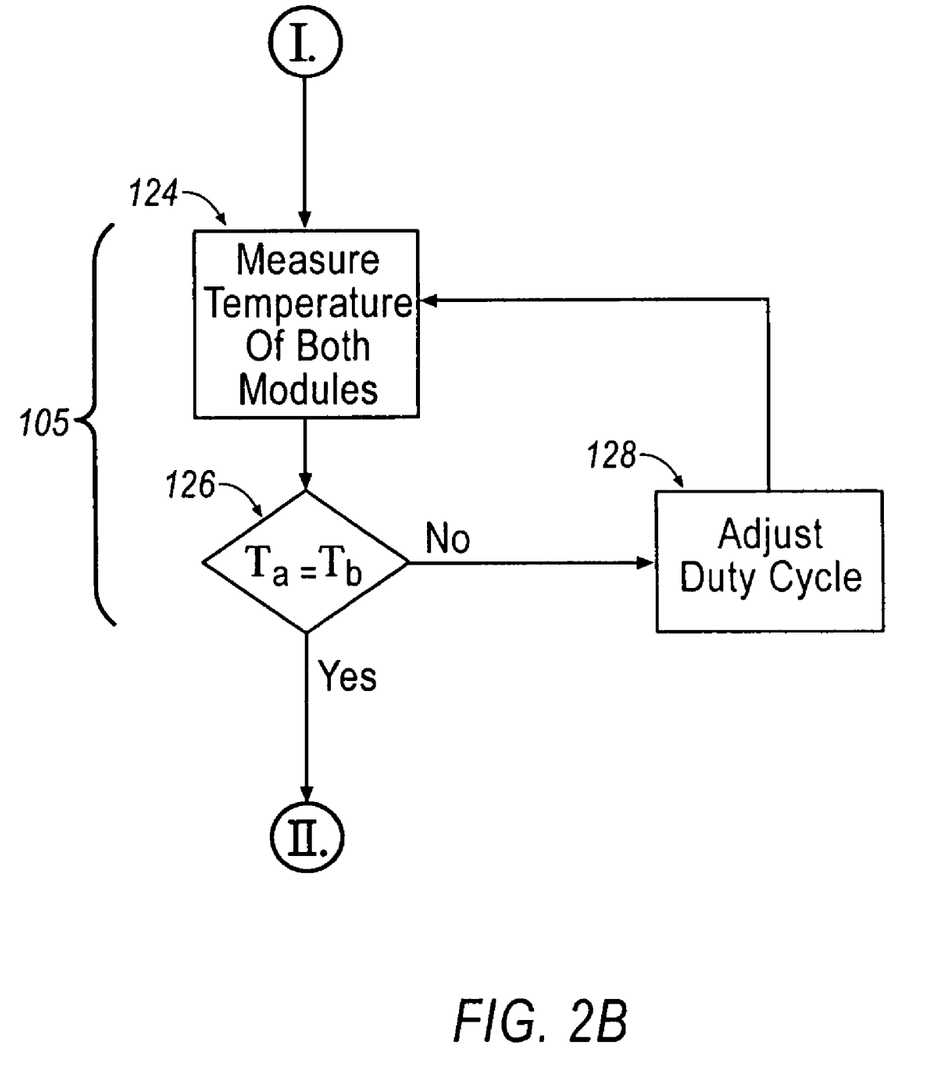

As seen in FIGS. 2A and 2B, a flow chart algorithm implementing the monitored parameters $V_{IN-AVG}$, $I_{IN-AVG}$, $V_{O-AVG}$, $I_{O-AVG}$, $T_a$, $T_b$, of the unit 10 is shown. In the following description, when the term 'efficiency' is used, efficiency is calculated by applying above-noted parameters in the following equation:

$$\text{Efficiency} = (V_{O\_AVG} \times I_{O\_AVG}) \div (V_{IN\_AVG} \times I_{IN\_AVG}).$$

The algorithm as shown in FIGS. 2A and 2B may also utilize a lookup table stored internal or external to the microprocessor 50. Depending on the application of the unit 10, the lookup table may store pre-programmed information or dynamically-created information based upon the monitored parameters. According to one embodiment of the invention, the lookup table may include data relating to power levels of the power converter unit 10. Other data provided in the lookup table may also include starting frequency data based upon a specific output power level.

The algorithm is started at step 100 when the electronic device is powered-on. As illustrated, the algorithm generally comprises three loops that monitors three predetermined parameters; however, it is contemplated that the algorithm is not necessarily limited to three loops monitoring three parameters and that any desirable number of loops and parameters may be programmed into the processor 50 at any time. The first loop in the algorithm, which is seen generally at 101, relates to power measurement, the second loop, which is seen generally at 103, relates to frequency measurement, and the third loop, which is seen generally at 105, relates to temperature measurement. Essentially, once the frequency is optimized in loop 103, the duty cycle of each module 25a, 25b is changed in loop 105 until the temperatures of the modules 25a, 25b are in balance. The algorithm generally assumes that operating under a high power results in operating under a high temperature. Although power sharing (i.e. evenly distributing the power) between the modules 25a, 25b may not necessarily be always equal, balancing the temperatures between the modules 25a, 25b will contribute to maximizing the efficiency of the unit 10.

As illustrated, the power measurement loop 101 measures the output power, $P_O$, at step 102, which is essentially equivalent to $V_{O\text{-}AVG} \times I_{O\text{-}AVG}$, and determines if the output power, $P_O$, is steady at step 104. If the output power, $P_O$, is not steady, the output power, $P_O$, is measured again at step 102, and, conversely, if the output power, $P_O$, is steady, the algorithm is advanced to the next step to determine the number of modules 25a, 25b to be activated. According to the illustrated embodiment, two modules 25a, 25b are shown; therefore, the algorithm anticipates that either one or two modules 25a, 25b may be activated. However, as stated above, any desirable number of modules 25a, 25b may be incorporated into the unit 10. At step 106, the measured output power, $P_O$, is compared against an operating system power level that is predetermined/preprogrammed or dynamically-determined, which, according to the illustrated embodiment, is $P_{LOW\text{-}MAX}$. $P_{LOW\text{-}MAX}$ is related to the upper value of the lower power range, $P_{LOW}$, in FIG. 5. For reasons explained in greater detail below, if the output power, $P_O$, is less than $P_{LOW\text{-}MAX}$, one module 25a, 25b is enabled at step 108. Conversely, if the output power, $P_O$, is greater than $P_{LOW\text{-}MAX}$, both modules 25a, 25b are enabled at step 110.

Once the number of activated modules 25a, 25b is determined, the processor 50 will select the starting frequency at step 112. The starting frequency may be preprogrammed as the maximum allowed frequency in the form of a hard number, or alternatively, the starting frequency may be selected from the lookup table by equating a selected starting frequency in view of the measured output power, $P_O$. Then, the processor 50 calculates the efficiency of the unit 10 at step 114 in view of the selected starting frequency and determines the efficiency of the unit at step 116. If it is determined that the selected starting frequency does not increase the efficiency of the unit 10, the frequency is decremented at step 118. For example, the frequency may be decremented in any desirable amount of units, such as, for example, 5 kHz. Essentially, the loop 103 primarily calculates and compares the efficiency each time the frequency is decremented in view of the efficiency at the previously calculated frequency. When the efficiency no longer needs to be decreased, the processor 50 determines that the efficiency of the unit 10 has been maximized and the algorithm will select the previous frequency prior to being decremented as the optimal switching frequency at step 120. The amount of time to determine the optimum frequency efficiency may be decreased if a lookup table is used because the starting frequency determined at step 112 will be closer to the final frequency determined at step 120.

At step 122, when the optimum frequency is obtained, and if two modules 25a, 25b are operating, the algorithm will shift the power sharing between the two modules 25a, 25b. Then, the temperature of both modules 25a, 25b are measured at step 124 and compared at step 126, and, if the temperatures are not the same, then the relative duty cycle is adjusted at step 128. Conversely, if the temperatures of the modules 25a, 25b are the same, the algorithm is looped to the power measurement step at step 102 to continuously monitor the efficiency of the electronic device.

Figure 3A:
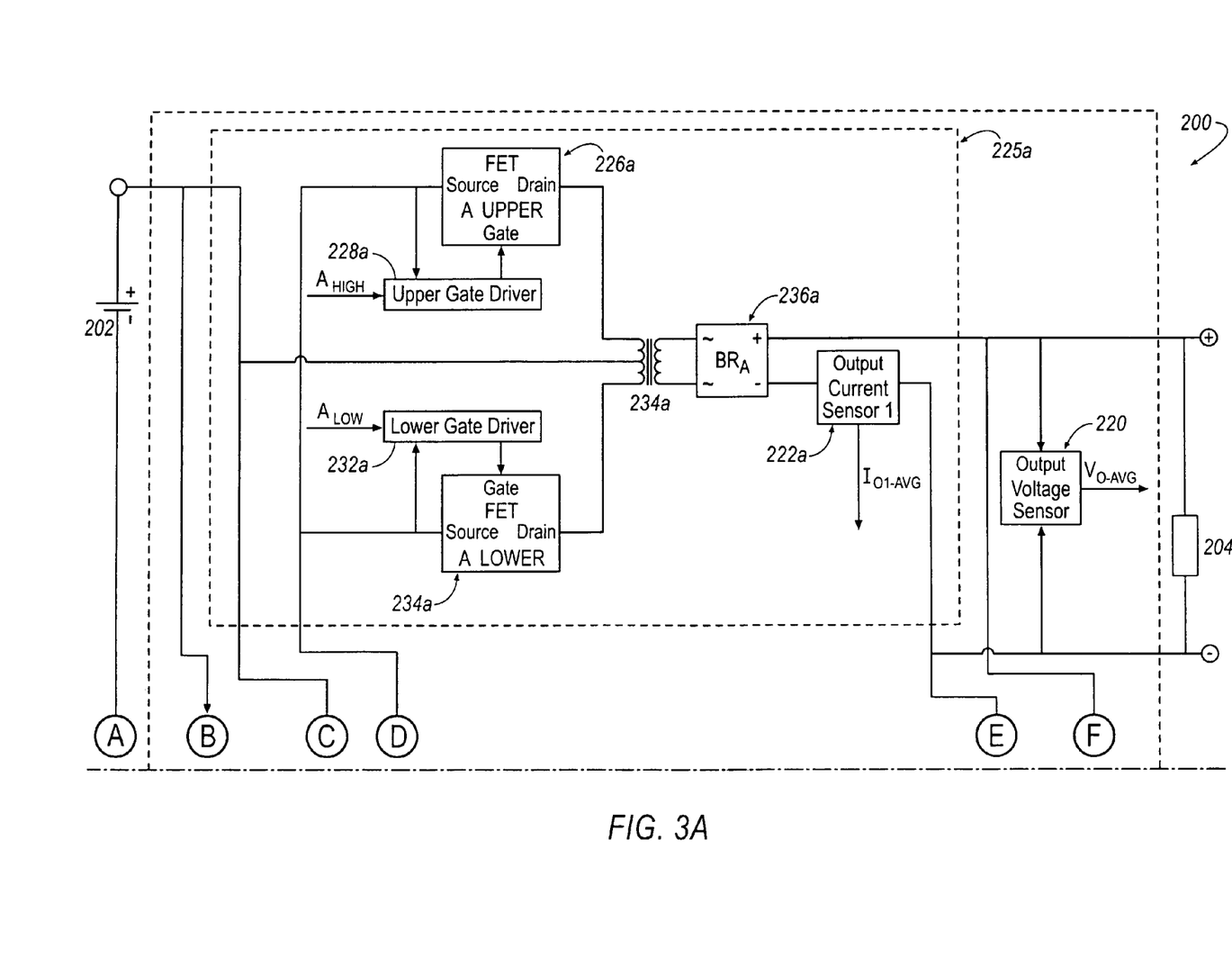
FIGS. 3A and 3B illustrate a dynamically optimized power converter unit according to another embodiment of the invention.
Figure 3B:
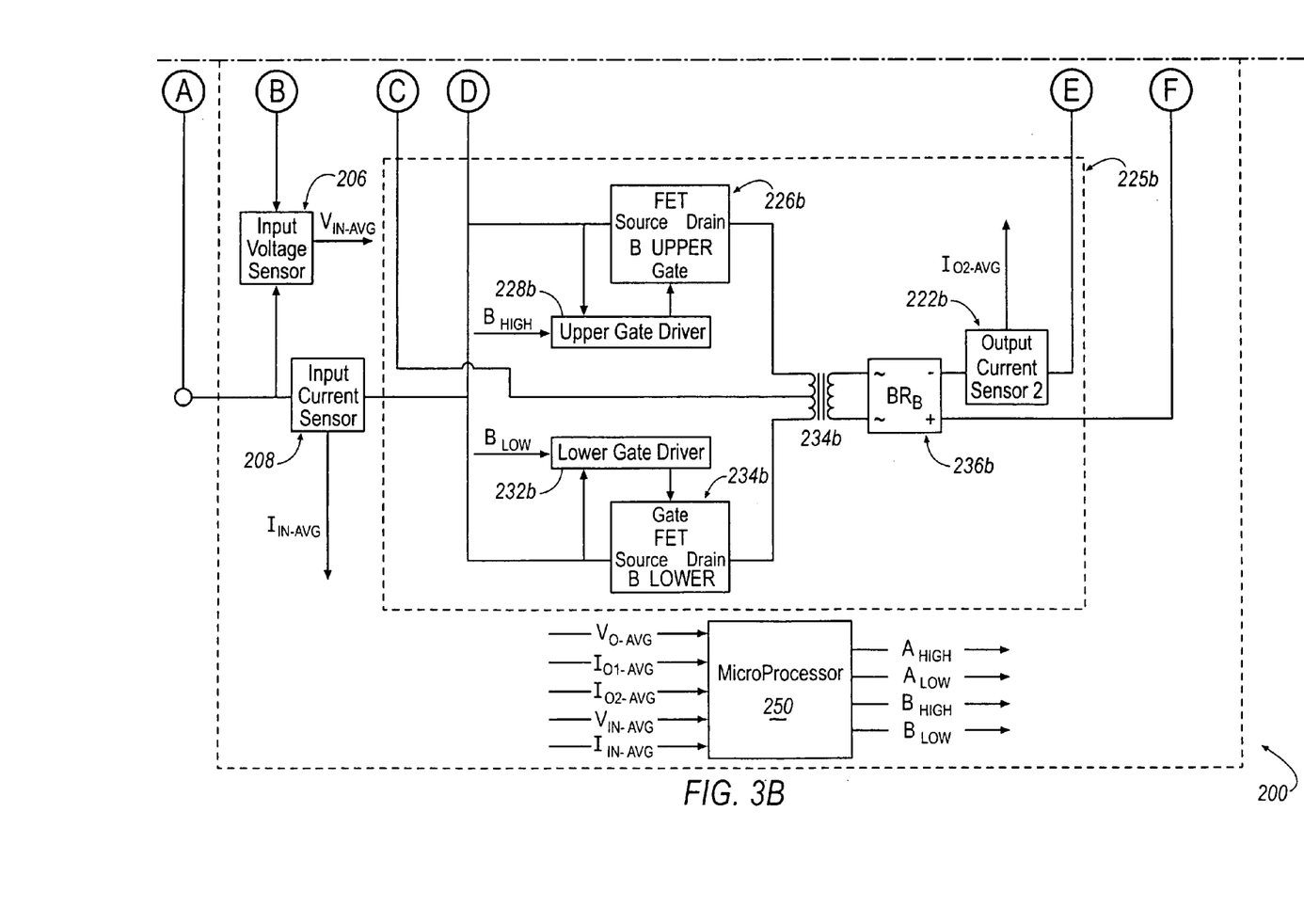

Referring now to FIGS. 3A and 3B, another embodiment of the hard-switched power converter unit is seen generally at 200. As illustrated, the power converter 200 generally includes and provides sensors relating to the same components as applied to the power converter 10. However, rather than considering temperature measurements for modules 225a, 225b, the power converter 200 considers the average output currents, $I_{O1\text{-}AVG}$, $I_{O2\text{-}AVG}$, from output current sensors 222a, 222b, respectively.

As seen in FIGS. 3A, 3B, the average output currents $I_{O1\text{-}AVG}$, $I_{O2\text{-}AVG}$, are derived from the output of isolation transformers 234a, 234b and bridge rectifiers 236a, 236b. Accordingly, the half-cycles of the transistors 226a, 226b and 234a, 234b provides voltage to the isolation transformers 234a, 234b which then steps up or steps down the voltage to the bridge rectifiers 236a, 236b, to isolate the output from the input. The voltages are common to the two modules 225a, 225b with one feedback, but each individual module 225a, 225b has its own current feedback. Therefore, when calculating the efficiency, total output power may be measured by summing the currents $I_{O\text{-}AVG}$, $I_{O2\text{-}AVG}$, multiplied by the output voltage, $V_{O\text{-}AVG}$; or output power may be measured for each module 225a, 225b by taking the output voltage, $V_{O\text{-}AVG}$, multiplied by one of the currents, $I_{O\text{-}AVG}$, $I_{O2\text{-}AVG}$.

Figure 4A:
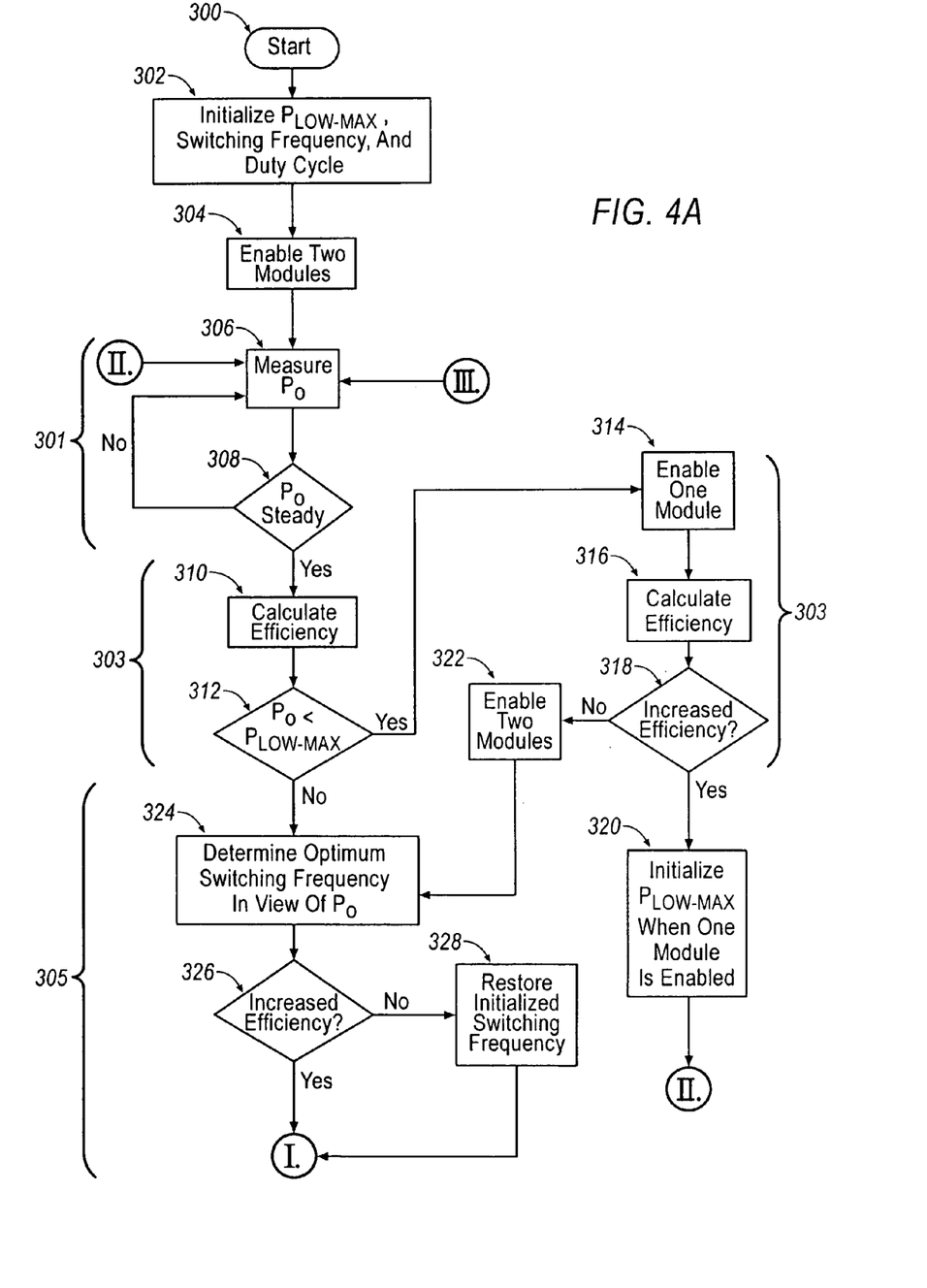
FIGS. 4A and 4B illustrate a flow chart algorithm for the dynamically optimized power converter unit according to FIGS. 3A and 3B.
Figure 4B:
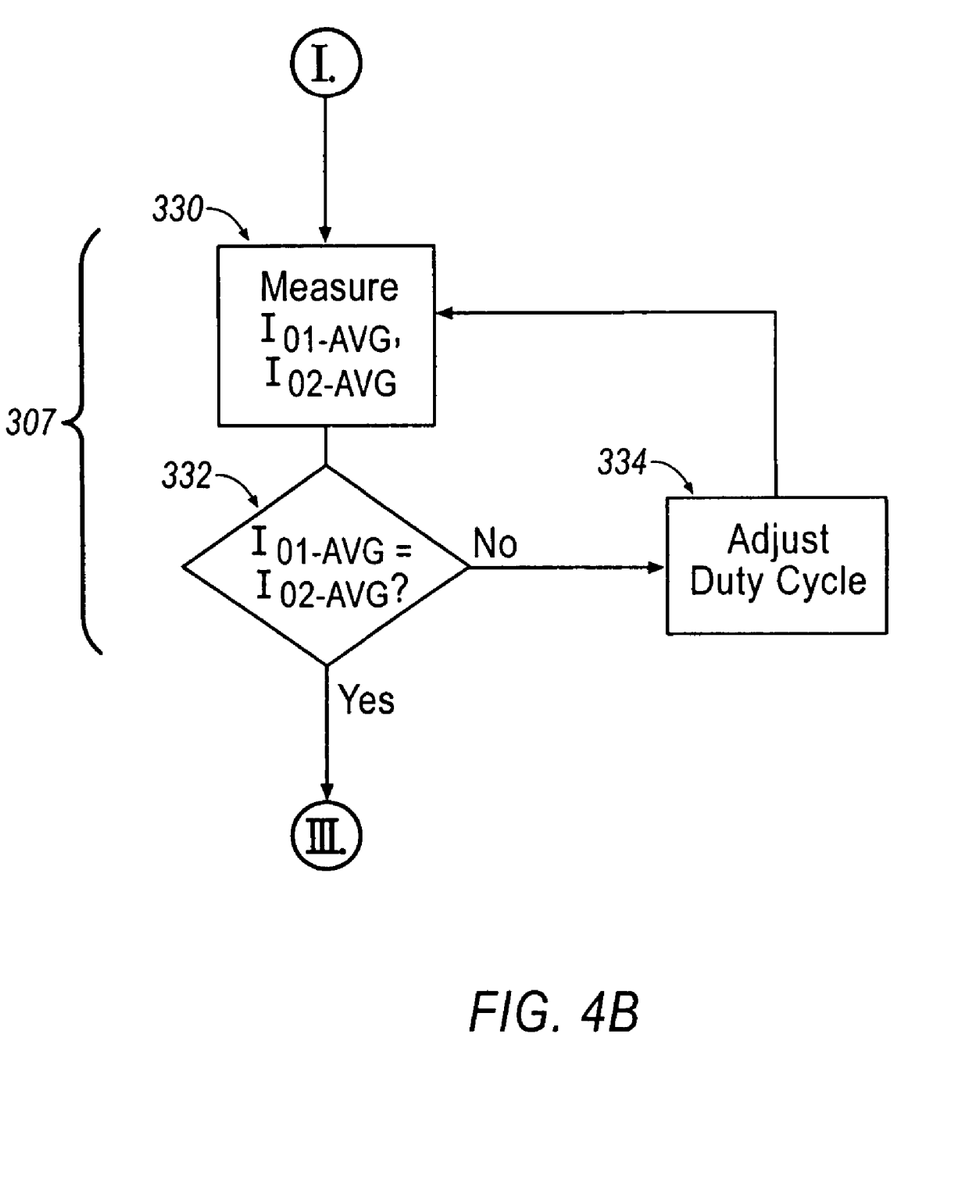

The algorithm for the power converter 200 is started at step 300 when the electronic device is powered-on. As illustrated, the algorithm generally comprises four loops relating to three predetermined parameters of the system; however, it is contemplated that the algorithm is not necessarily limited to four parameters and that any desirable number of loops and parameters may be programmed into the processor 250 at any time. The first loop in the algorithm, which is seen generally at 301, relates to power measurement, the second loop, which is seen generally at 303, relates to number of modules running, the third loop, which is seen generally at 305, relates to switching frequency, and the forth loop, which is seen generally at 307, relates to average output current measurement of each module 225a, 225b and duty cycle.

Prior to starting the power measurement loop 301, the algorithm initializes $P_{LOW\text{-}MAX}$, switching frequency, and the duty cycle, at step 302, then, at step 304, both modules 225a, 225b are enabled (rather than one as shown in FIGS. 2A, 2B). The initializations at step 302 may include values that are preprogrammed or harvested from the lookup table. Then, at step 306, the output power, $P_O$, is measured. If the output power, $P_O$, is not steady, the output power, $P_O$, is measured again at step 306, and, conversely, if the output power, $P_O$, is steady, the algorithm is advanced to the next steps at 310 and 312 to calculate efficiency and determine if the measured output power, $P_O$, is less than initialized $P_{LOW\text{-}MAX}$. If the output power, $P_O$, is less than initialized $P_{LOW\text{-}MAX}$, one module 225a, 225b is enabled at step 314. Conversely, if the output power, $P_O$, is greater than initialized $P_{LOW\text{-}MAX}$, both modules 225a, 225b remain active and the algorithm is advanced to step 324.

If one module is enabled at 312, the efficiency is calculated by the processor 250 at 316 and the algorithm determines if the efficiency should be increased at step 318. If the system is operating at a higher efficiency when one module 225a, 225b is enabled, the algorithm will re-initialize $P_{LOW\text{-}MAX}$ at step 320 when one module is enabled and return to step 306 with one module 225a, 225b enabled at the outset of the power measurement rather than two modules 225a, 225b being enabled to determine if the system is more efficient with one module 225a, 225b activated. Conversely, if the system not more efficient when one module 225a, 225b is enabled, then two modules are enabled again at step 322.

Upon determining the number of modules being enabled, the optimum switching frequency is determined at step 324 in view of the measured output power, $P_O$, at step 306. As an example, the optimum switching frequency may be selected from the lookup table by equating the switching frequency in view of the measured output power, $P_O$. Then, the processor 250 determines the efficiency of the unit 200 at step 326 in view of the switching frequency determined at step 324. If the efficiency was not increased, then initialized switching frequency from step 302 is restored at step 328; conversely, if the efficiency was increased, then the algorithm is advanced to step 330.

At step 330, the average output currents $I_{O1\text{-}AVG}$, $I_{O2\text{-}AVG}$ of both modules 225a, 225b are measured. If the average output currents $I_{O1\text{-}AVG}$, $I_{O2\text{-}AVG}$ of both modules are the same, then the algorithm is looped back to step 306. Conversely, if the average output currents $I_{O1\text{-}AVG}$, $I_{O2\text{-}AVG}$ are not the same, the initialized relative duty cycle from step 302 is adjusted at step 334 (i.e. the duty cycle is incremented or decremented in view of the initialized duty cycle which is determined by the programmer) and then the algorithm is looped back to step 330 until maximum efficiency is attained when both output currents $I_{O1\text{-}AVG}$, $I_{O2\text{-}AVG}$ are the same. Similarly as discussed above, although two modules 225a, 225b are discussed in relation to the algorithm illustrated in FIGS. 4A, 4B, any desirable number of modules 225a, 225b may be incorporated into the unit 200.

Figure 5:
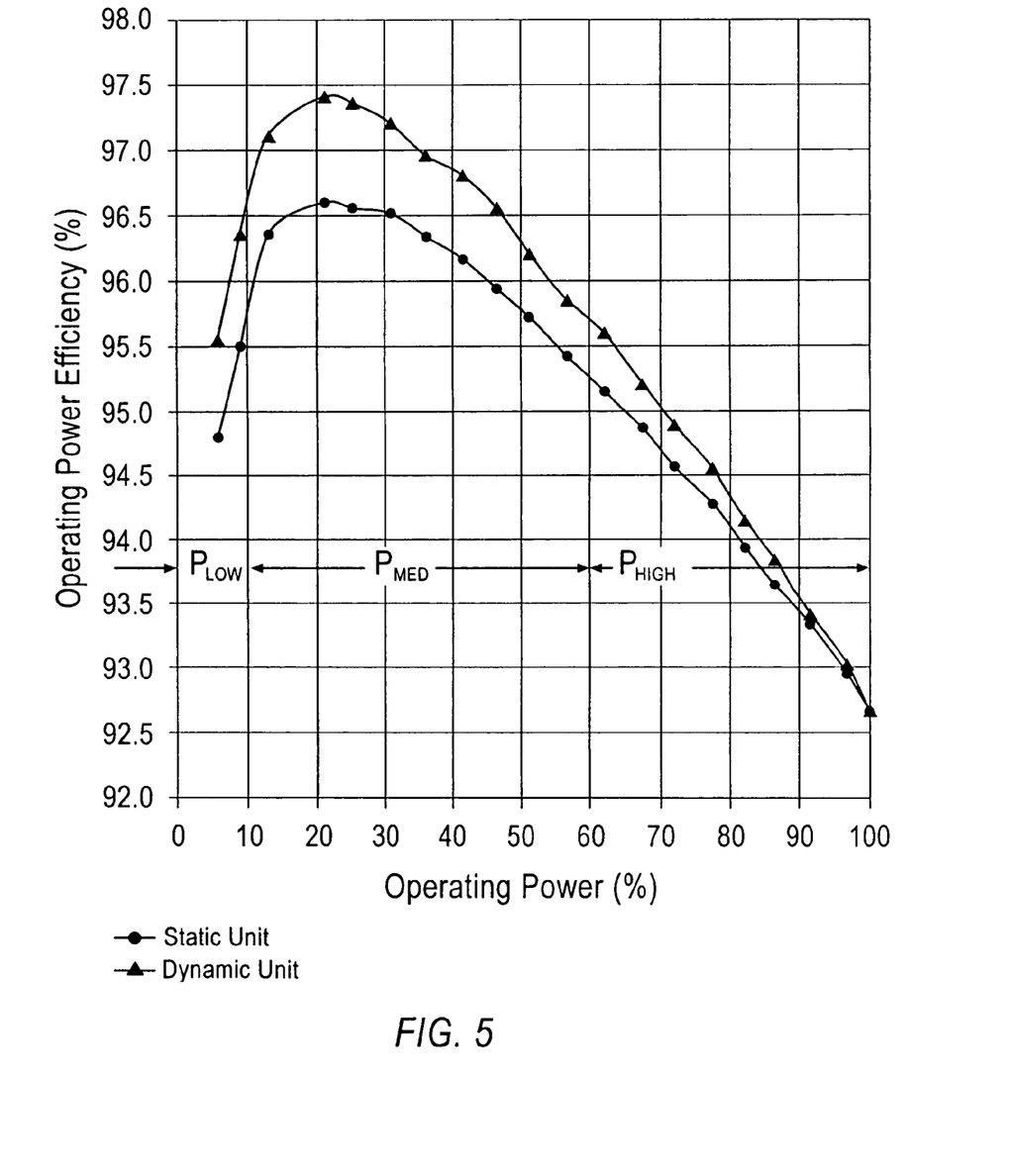
FIG. 5 illustrates a graphical representation comparison of a conventional, statically-optimized power converter in view of the dynamically optimized power converter unit according to FIGS. 1A, 1B and 3A, 3B.

In relation to the discussion of the flow charts illustrated in FIGS. 2A, 2B and 4A, 4B, a power efficiency curve is seen in FIG. 5. The efficiency is represented on the y-axis and units on the x-axis are related to the percentage of the operating power used by the unit 10, 200. The graphical representations include the efficiency results of a conventional, statically-optimized power converter (i.e., the lower curve with circular plot points) and a dynamically optimized power converter (i.e., the upper curve with triangular plot points) related to the unit 10, 200. According to the illustrated embodiment of the invention described in FIGS. 2A, 2B and 4A, 4B, the optimization parameters that relate to the upper curve are number of operating modules, switching frequency, and temperature.

Power level ranges on the x-axis are subcategorized into low power, $P_{LOW}$, medium power, $P_{MED}$, and high power, $P_{HIGH}$. Generally, as described above in relation to FIGS. 2A, 2B and 4A, 4B, the $P_{LOW}$ range is generally related to lower-end operating power parameters of the electronic device, the $P_{MED}$ range is generally related to the switching frequency parameter, and the $P_{HIGH}$ range is generally related to the temperature parameter. Although specific ranges are pointed out in FIG. 5 for $P_{LOW}$, $P_{MED}$, and $P_{HIGH}$, the ranges are not limited as illustrated and may vary from 5% to as much as 70%, depending on the number of modules 25a, 25b and 225a, 225b incorporated into the unit 10, 200 for a specific application. However, for most applications, it is contemplated that $P_{MED}$ and $P_{LOW}$ comprises the largest zone and smallest zones, respectively.

As explained above in relation to FIGS. 2A and 2B, to increase the efficiency of the unit 10, only one of the modules 25a, 25b is in operation when normalized power for the unit 10 operates in the low power range, PLOW. Essentially, the processor 50 deactivates one of the converter modules 25a, 25b when the unit 10 is operating in the PLOW range, and efficiency is increased by reducing approximately one-half of the bias current applied to the FET gate drives. At the upper end of $P_{LOW}$, efficiency may be further maximized when the processor 50 reduces the switching frequency when the unit is operating at less than full power.

Conversely, both modules are active when the unit 10 operates in the $P_{MED}$ and $P_{HIGH}$ ranges. Relating to the algorithm described in FIGS. 4A, 4B, it can be assumed that the unit 200 is operating at a high power since two modules are activated at the outset; however, the algorithm is also suitable for operating in the PLOW range as well because the algorithm permits stepping down to one module if it is determined the unit 200 is not operating at a higher efficiency when two modules are enabled. Referring back to the unit 10, in the $P_{MED}$ range, which is less than full power, the processor 50 seeks the optimum switching frequency at each operating point because the magnetics in the unit 10 are typically designed for the maximum allowable flux density at full power. Accordingly, as power is reduced, the unit 10 flux density becomes less, which allows the frequency to be lowered, providing improved efficiency for the unit 10. In the $P_{HIGH}$ range, the processor 50 seeks parameters relating to resistive losses. As explained above, $I^2R$ resistive losses may be related to layout differences, component variations, and timing differences, which summarily can lead to an unbalance in power distribution between modules. Because temperature is a good indicator of power dissipation, temperature is measured as the criteria for power sharing in the $P_{HIGH}$ range. Relating to component variations, temperature affects the actual capacitive and inductive values, but also has a lot to do with $I^2R$ losses. Typically, temperature is a measure of any large differences in DC power losses for FETs, which are typically implemented for low voltage converters. Therefore, if efficiency of the unit 10 is being affected as a result of component tolerances, aging, or distance to a cooling source, one of the modules will tend to carry more power than the other because one of the modules may be operating at a higher temperature. Therefore, temperature is monitored to shift the power load in an attempt to equalize the power between the modules 25a, 25b.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. For example, the method of this invention is not limited to the described optimization parameters. Even further, the invention is not limited by the illustrated algorithm, as other algorithms are possible. The exemplary embodiments are merely illustrative and should not be considered restrictive in any way. The scope of the invention is defined by the appended claims and their equivalents, rather than by the preceding description.

What is claimed is:

1. A method of dynamically optimizing a power converter including a plurality of converter modules connected in parallel between a power source and a load, comprising the steps of:
   (a) initially activating each of said converter modules to supply power to said load;
   (b) measuring an output power of said power converter;
   (c) calculating an initial efficiency of said power converter when the measured output power is steady;
   (d) identifying which of the converter modules should remain activated based on the measured output power, and deactivating any non-identified converter modules;
   (e) calculating a present efficiency of said power converter after deactivating the non-identified converter modules;
   (f) comparing the present efficiency with the initial efficiency, and activating the deactivated converter modules if the current efficiency is less than the initial efficiency; and
   (g) periodically repeating steps (a) through (f).

2. A method of dynamically optimizing a power converter including a plurality of converter modules connected in parallel between a power source and a load, comprising the steps of:
   (a) initially activating each of said converter modules, and setting a switching frequency of each converter module to an initial value;
   (b) measuring an output power of said power converter;

(c) calculating an initial efficiency of said power converter when the measured output power is steady;
(d) identifying which of the converter modules should remain activated based on the measured output power, and deactivating any non-identified converter modules;
(e) calculating a present efficiency of said power converter after deactivating the non-identified converter modules;
(f) comparing the present efficiency with the initial efficiency, and activating the deactivated converter modules if the current efficiency is less than the initial efficiency;
(g) reducing the switching frequency of each converter module by a prescribed amount;
(h) re-calculating the efficiency of said power converter to determine whether the efficiency increased due to the switching frequency reduction of step (g);
(i) repeating steps (g) and (h) until it is determined that the efficiency has not increased; and
(j) periodically repeating steps (b) through (i).

3. A method of dynamically optimizing a power converter including a plurality of converter modules connected in parallel between a power source and a load, comprising the steps of:
(a) initially activating each of said converter modules, and setting a switching frequency of each converter module to an initial value;
(b) measuring an output power of said power converter;
(c) calculating an initial efficiency of said power converter when the measured output power is steady;
(d) identifying which of the converter modules should remain activated based on the measured output power, and deactivating any non-identified converter modules;
(e) calculating a present efficiency of said power converter after deactivating the non-identified converter modules;
(f) comparing the present efficiency with the initial efficiency, and activating the deactivated converter modules if the current efficiency is less than the initial efficiency;
(g) reducing the switching frequency of each converter module by a prescribed amount;
(h) re-calculating the efficiency of said power converter to determine whether the efficiency increased due to the switching frequency reduction of step (g);
(i) repeating steps (g) and (h) until it is determined that the efficiency has not increased;
(j) iteratively adjusting a duty cycle of each activated converter module to equalize measured temperatures of the activated converter modules; and
(k) periodically repeating steps (b) through (j).

* * * * *